Sept. 18, 1951  G. M. PORTER  2,568,253
ELECTRIC WEIGHER
Filed June 30, 1947  6 Sheets-Sheet 1

GLENN M. PORTER
INVENTOR.
BY
ATTORNEY

Sept. 18, 1951 G. M. PORTER 2,568,253
ELECTRIC WEIGHER
Filed June 30, 1947 6 Sheets-Sheet 2

GLENN M. PORTER
INVENTOR.
BY
ATTORNEY

Sept. 18, 1951  G. M. PORTER  2,568,253
ELECTRIC WEIGHER

Filed June 30, 1947  6 Sheets-Sheet 3

GLENN M. PORTER
INVENTOR.

BY
ATTORNEY

Sept. 18, 1951  G. M. PORTER  2,568,253
ELECTRIC WEIGHER
Filed June 30, 1947  6 Sheets-Sheet 4

GLENN M. PORTER
INVENTOR.

BY
ATTORNEY

Sept. 18, 1951  G. M. PORTER  2,568,253
ELECTRIC WEIGHER
Filed June 30, 1947  6 Sheets-Sheet 5

GLENN M. PORTER
INVENTOR.
BY
ATTORNEY

Sept. 18, 1951  G. M. PORTER  2,568,253
ELECTRIC WEIGHER
Filed June 30, 1947  6 Sheets-Sheet 6

GLENN M PORTER
INVENTOR.
BY
ATTORNEY

Patented Sept. 18, 1951

2,568,253

UNITED STATES PATENT OFFICE 2,568,253

ELECTRIC WEIGHER

Glenn M. Porter, Riverside, Calif., assignor to Food Machinery and Chemical Corporation, a corporation of Delaware Application June 30, 1947, Serial No. 757,985

2 Claims. (Cl. 249—20)

This invention relates to automatic scales and is particularly useful in weighing bulk products in loose form.

It is an object of the invention to provide a novel automatic weigher which is adapted to receive a more or less continuous stream of loose material from a conveyor and weigh this in equal lots so that the aggregate weight of all the material passing through the weigher will be recorded.

It is another object of the invention to provide such an automatic weigher which is electrically controlled to assure uniformly precise operation thereof.

A yet further object of the invention is to provide such an automatic weigher which is especially adapted to handle fruit such as citrus fruit, apples, pears, peaches and the like, and to do this gently so as to cause a minimum of damage to the fruit by bruising.

The manner of accomplishing the foregoing objects as well as further objects and advantages will be made manifest in the following description taken in connection with the accompanying drawings in which.

Figure 1:
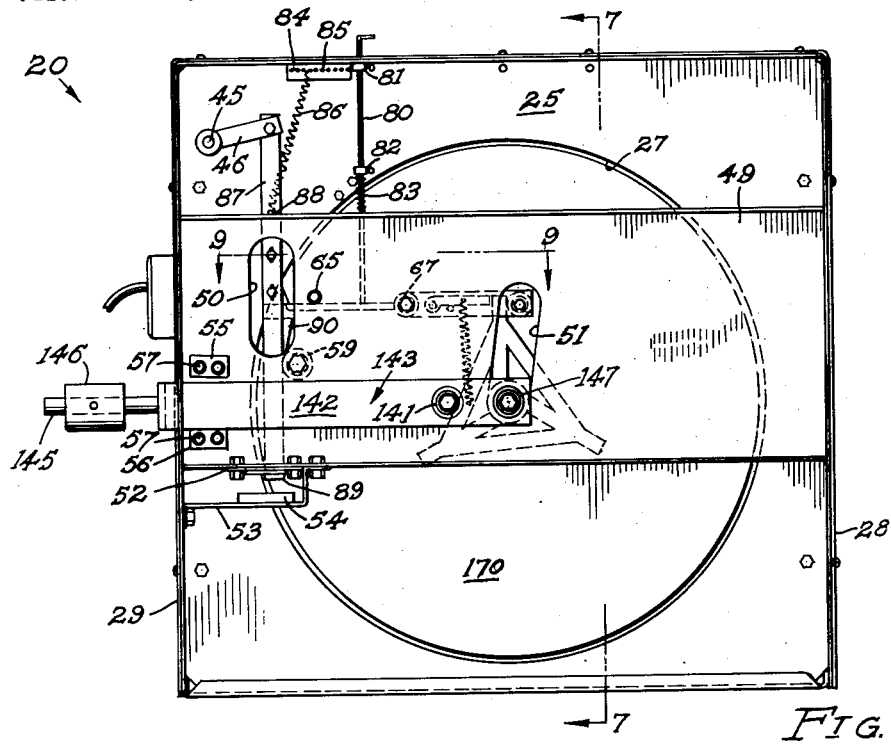
Fig. 1 is a right side elevational view of a preferred embodiment of the invention with the cover for that side thereof removed, and illustrating the visible parts positioned as at the conclusion of one weighing operation and at the instant of commencing the next.

Referring specifically to the drawings, the invention is shown therein as preferably embodied in an automatic bulk weigher 20. This includes a frame 21 having two box-like side standards 22 and 23 which have bottom plates 24, inner plates 25 and 26 which are off-set inwardly at a level near their middle and each of which has a large circular hole 27.

The box-like structure of the standards 22 and 23 is completed by front and rear walls 28 and 29 and a top wall 30 of a weigher housing shell 31 which overlap and are united with the bottom plates 24 and inner plates 25 and 26 of the standards 22 and 23.

Formed in the upper wall 30 and in an adjacent upper portion of the rear wall 29, between the standards 22 and 23, is a material receiving opening 32. The upper edge of the wall 29 between said standards is turned in to form a delivery ledge 33. Another ledge 34, spaced downwardly therefrom and fixed at its opposite ends to the plates 25 and 26, is disposed downwardly from the ledge 33 and adjacent the holes 27.

Cover plates 36 are removably secured to the standards 22 and 23 to cover the outer faces of the latter. Pivoted at its upper edge upon the plates 25 and 26, and hanging downwardly to a level adjacent the high points of the holes 27, is a leveler 40. A similar leveler 41 is pivotally suspended in the same manner at its upper edge and is held sloping outwardly by chains 42 so that its curved lower portion is adjacent to and substantially conforms with the hole 27.

The chains 42 connect to one of four spacers 43 which unite and hold the plates 25 and 26 in rigidly spaced relation. Disposed in the space between the latches 33 and 34 is a bridge plate 44 which is mounted, at one edge, upon a shaft 45, the latter journalling in suitable bearings in the plates 25 and 26. At its opposite ends, the shaft 45 is provided with arms 46 and 47.

The standard 22 includes a channel member 50, ends of which are secured by welding to the housing walls 28 and 29. Formed in member 50 are peek holes 51 and 52. Fixed on the lower edge of the channel member 50 is a slotted guide plate 52. A bracket 53 also secured to said member and to the wall 29, has mounted thereon a rubber cushion block 54. Spaced cushion blocks 55 and 56 are fixed by bolts 57 to the outer surface of the member 50. Rotatably mounted inwardly from the member 50 on a stud 58 provided on said member is a cam roller 59. Also extending inwardly from the member 50 is a spring stud 60. Mounted on the member 50 to extend inwardly therefrom, is a stop lever stud 65.

Also mounted on the member 50 and disposed inwardly therefrom is a lever pin 66 on which pivots a stop lever 67 having arms 68 and 69. The arm 68 is adapted to engage the stud 65 to limit the downward movement of the arm 69, the latter having a roller 70 pivotedly mounted thereon, near its end. Extending inwardly from the arm 69 is a pivot pin 71 and a limit pin 72. Pivotedly mounted on the pin 71 is a latch 73 which normally rests against the limit pin 72. This latch has a pin 74 to which one end of a contractile coil spring 75, connects the other end connecting to the spring stud 60.

Extending through the top wall 30 and upper flange of the member 50 and into contact with the arm 68 and the lever 67, is a manual trip rod 80 having an upper stop collar 81 and a lower stop collar 82 and a spring 83 coiled about the rod between the member 50 and the collar 82 to yieldably hold the rod in its uppermost position.

Secured to the top wall 30 and the standard 22 is a perforated angle bracket 84 having a series of holes 85, any one of which may be used for the purpose of attaching a spring 86 thereto. Pivotedly connected to the arm 46 is a trip bar 87 having a pin 88 to which the other end of the spring 86 is connected.

The bar 87 extends downwardly through a slot in the plate 52 which allows the bar 87 a slight degree of guided horizontal swinging movement parallel with the member 50. The lower end of the bar 87 has a foot 89 bent outwardly therefrom which limits the upward movement of this bar in response to the action of the spring 86 and provides a substantial horizontal area of contact between bar 87 and the rubber cushion 54 when the operation of the weigher requires this.

Fixed as by welding on the bar 87 is a withdrawal cam 90. The cam 90 is disposed adjacent to the roller 59 so that downward movement of the bar 87 shifts the latter to the left. Secured to the bar 87 by bolts 95 so as to be vertically adjustable thereon is a stop lever trip 96.

Secured at its opposite ends as by welding to the walls 28 and 29 in the standard 23 is a channel member 110. This has a hole 111 formed therein and a pair of cushion stop blocks 55 and 56 adjustably secured thereto by bolts 57 and identical with the correspondingly numbered blocks provided on channel member 50.

Mounted on member 110 is a trip control microswitch 113 having a switch arm 114 extending downwardly therefrom. Also mounted on said member is a solenoid 115 having an armature 116 which is connected by a stout contractile spring 117 to the arm 47.

Provided on the member 110 and extending inwardly therefrom is a pivot pin 118 on which is pivoted a cam follower lever 119 having a cam following arm 120 and a switch actuating arm 121.

Mounted on the member 110 is a counter-switch 122 having a switch arm 123 which is adaptable to be actuated by the arm 121. The arm 121 is connected by a spring 124 to a cotter pin 125 mounted in the lower flange of the member 110 so as to normally hold this arm out of contact with the switch arm 123.

Formed integrally with and extending upwardly from the arm 47 is an arm 130 which is pivotedly connected to a piston rod 131 having a piston 132 which slides in a dash pot cylinder 133 having an adjustable exhaust valve 134 and an intake check valve 135.

Figure 13:
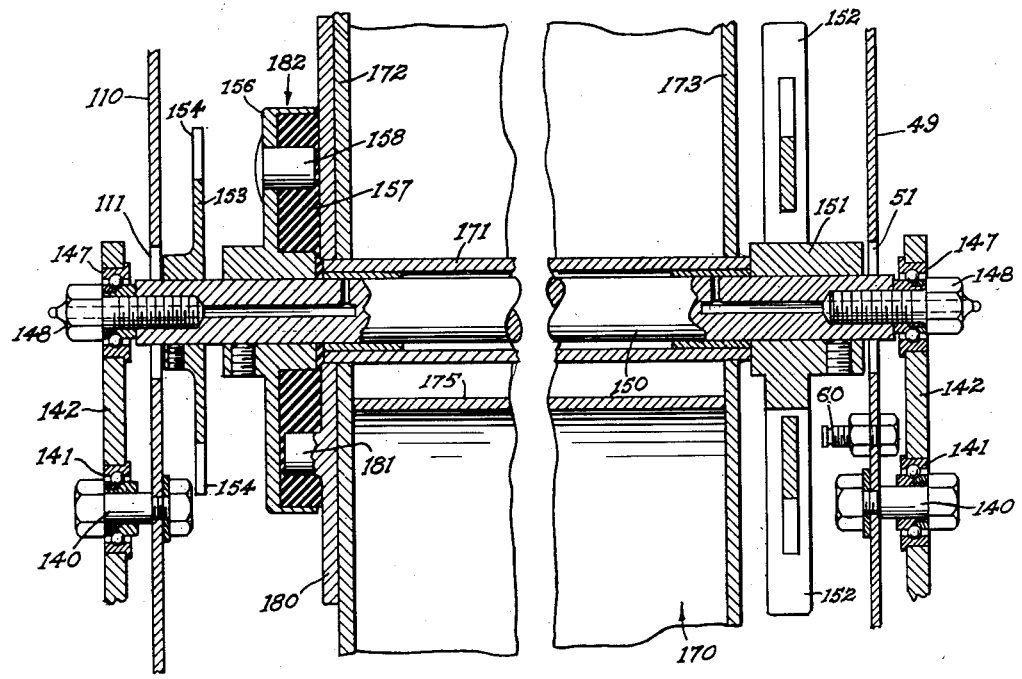
Fig. 13 is an enlarged sectional view taken on the line 13—13 of Fig. 7.

Fixed on the channel members 50 and 110 (see Fig. 13) are bearing pins 140 carrying ball bearings 141 which pivotedly support side arms 142 of a U-shaped scale beam 143 which is made up of these two arms and a cross bar 144 formed integral with and connecting their outer ends.

Figure 12:
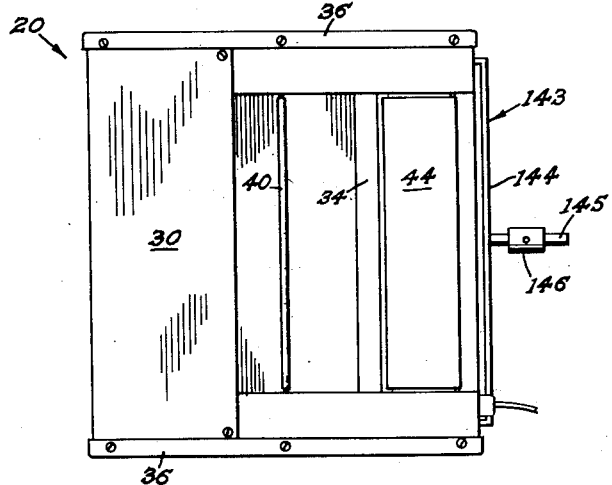
Fig. 12 is a plan view at a reduced scale of the weigher of the invention.
Figure 11:
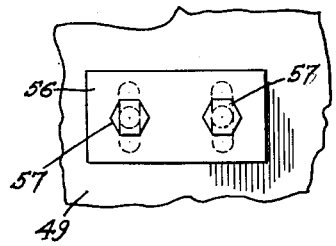
Fig. 11 is an enlarged elevational view of an adjustably mounted stop block as shown in smaller scale in Figs. 3 and 5.

The cross bar 144 carries a scale bar 145 on which is provided an adjustably mounted counter-balance weight 146 (see Fig. 12).

Mounted near the free ends of the scale beam side arms 142 are ball bearings 147 through which screws 148 extend to screw into threaded holes provided in opposite ends of a shaft 150 to rotatably mount said shaft in said bearings.

Fixed on said shaft just within the member 50 is a spider 151, this spider having three lugs 152 extending radially therefrom. Fixed on the shaft 150 just within the member 110 is a triangular cam 153 having three high points 154. Also fixed on the shaft 150 just inside the cam 153, is a cushion drum 156 enclosing a rubber cushion 157 into which three pins 158 formed on said drum extend at spaced intervals.

Rotatably mounted on the shaft 150 between the cushion drum 156 and the spider 151 is a scale rotor 170 having a hub 171 and side walls 172 and 173 welded thereto. The space within the side walls are divided into weighing bins 174 by curved partitions 175.

Fixed to the rotor side wall 172, as by welding, is a plate 180 having three pins 181 which extend into the rubber cushion 157 at spaced intervals between the pins 158 of the drum 156. A torque cushion 182 is thus provided between the shaft 150 and the rotor 170, the purpose of which will be pointed out hereinafter.

Operation

The weigher 20 performs its function at the discharge end of a conveyor which delivers loose material such as citrus fruit or apples onto the ledge 33 from which they roll over the bridge plate 44 and ledge 34 into an upwardly disposed rotor bin 174. Provided beneath the weigher is a stop conveyor or chute (not shown) to receive fruit after it is weighed and upon its being discharged from the weigher. The feed and discharge conveyors have not been shown as they constitute no part of the invention.

Before starting weighing operations the counter-weight 146 is adjustably secured on the scale arm 145 so as to cause the weigher 20 to weigh and discharge a predetermined weight of material such as fifteen or twenty pounds in each cycle of operation. Each such cycle involves a ⅓ revolution of the rotor 170 and starts and ends with the various elements of the weigher positioned as shown in Figs. 1, 2, 7, 8, 9, 10 and 14.

At the outset, the switch 122 is connected up in an electric circuit (not shown) of a counter (not shown) which will count the number of weighing cycles completed by the weigher.

Figure 2:
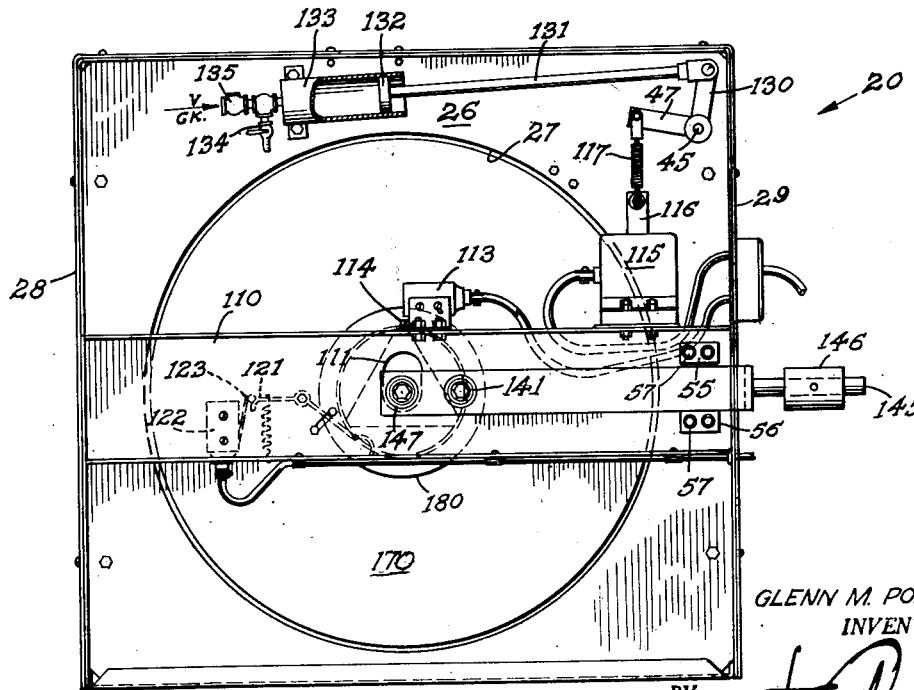
Fig. 2 is a side elevational view of the left side of said weigher with the cover for that side removed and showing the visible parts as positioned at the same instant mentioned in the description of Fig. 1.
Figure 14:
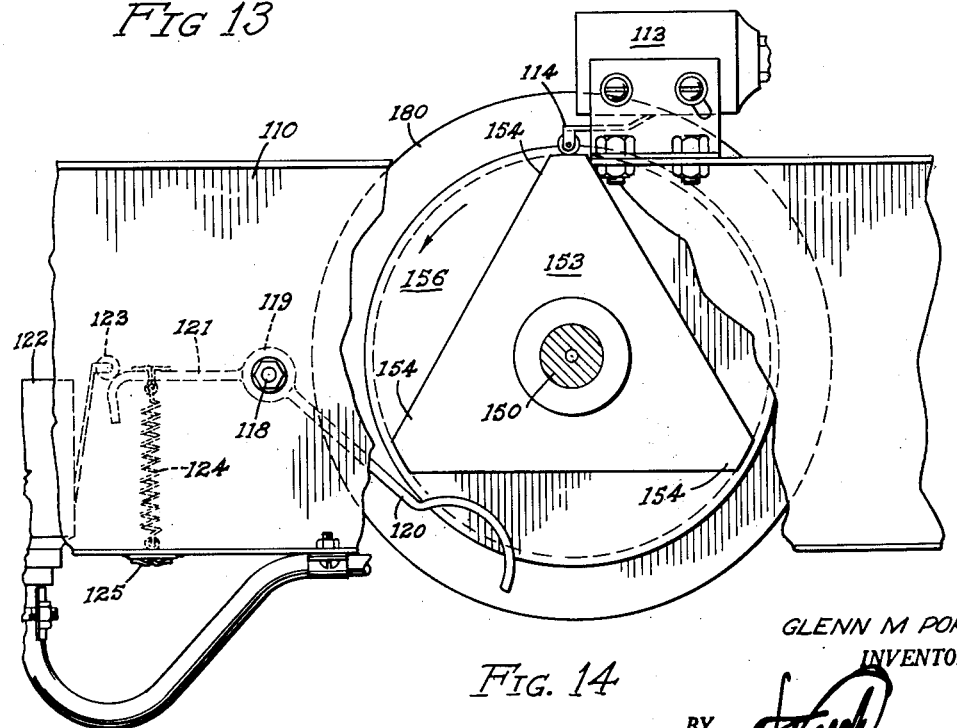
Fig. 14 is an enlarged vertical sectional view taken on the line 14—14 of Fig. 7.

The electric circuit of the solenoid 115, which includes the switch 113, is also energized. The switch 113 is arranged to break the circuit of the solenoid 115 whenever the switch cam 113 swings into the position in which it is shown in Figs. 2 and 14 and to close this circuit when the switch arm 114 is allowed to be lowered a fixed and relatively short distance below the position in which it is shown in these figures.

The valve 134 is also adjusted to control the discharge of air from the cylinder 133 through this valve to impose a desired degree of dampening effect on the response of the shaft 45 to the operation of the solenoid 115.

The purpose of the dash pot 133 is to prevent this response from being too rapid as will be pointed out hereinafter.

Assuming that the weigher 20 is installed in a citrus packing house for the weighing of oranges, the operation of the weigher starts with a delivery of oranges over the ledge 33, bridge 44 and ledge 34 into the upwardly disposed bin 174. The curtains 40 and 41 act as baffles to slow up fruit which might on occasion bounce upwardly, and prevent their being lost out of this bin.

Figure 3:
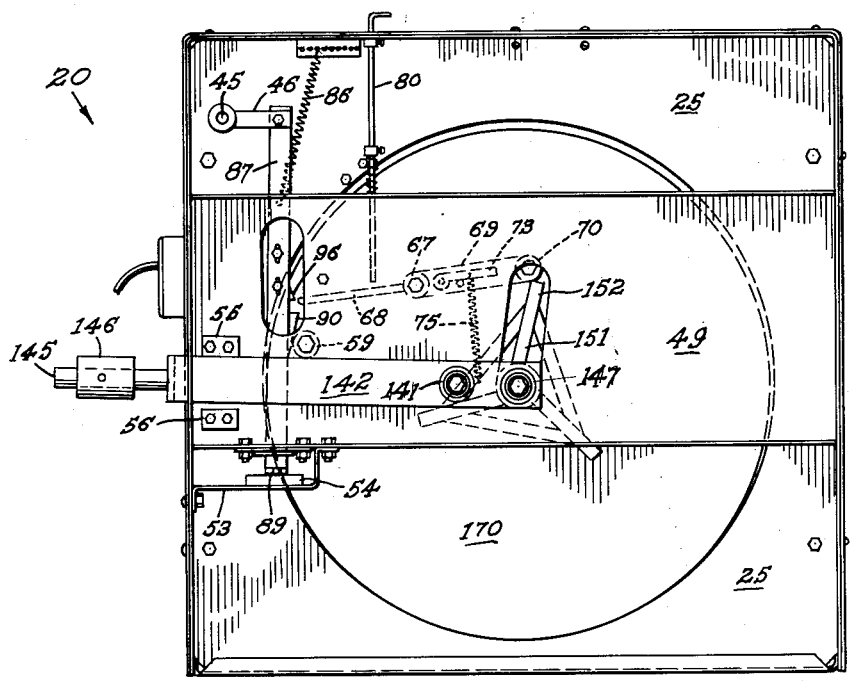
Fig. 3 is a view similar to Fig. 1 but with the visible parts therein positioned as occurs at a certain instant just after a predetermined weight of material has been delivered to the scales of the weigher and the latter has been tripped thereby, to initiate a discharge of said material.
Figure 4:
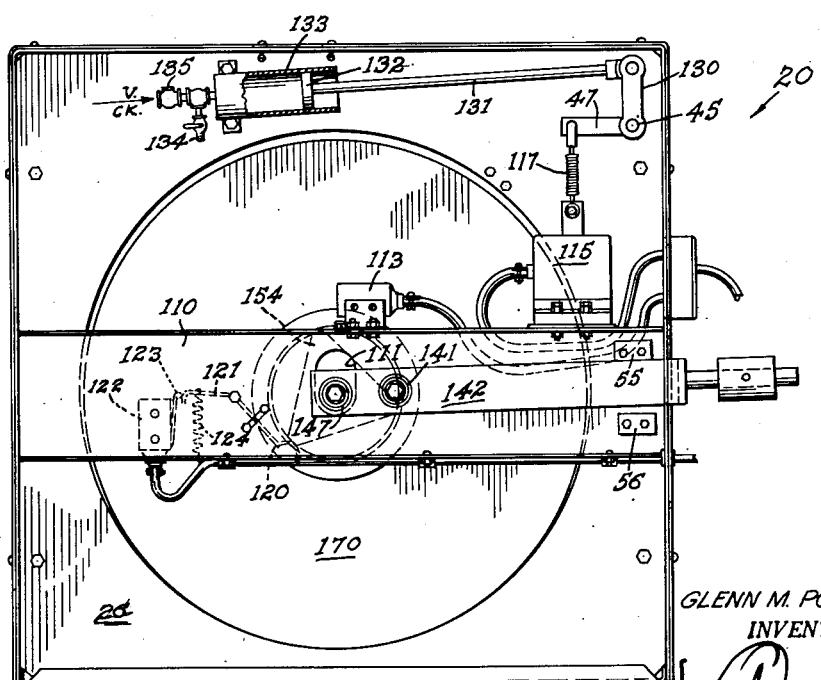
Fig. 4 is a view similar to Fig. 2 showing the visible parts positioned as occurs in the operation of the weigher at the same instant mentioned in the description of Fig. 3.

When a predetermined weight of material which the counter-balance has been set for, has been received, the scale beam 143 is rocked about the bearings 141 as the rotor 170 sinks under the weight of this fruit. This lifts the scale beam 143 from the stop blocks 56 against the stop blocks 55 as shown in Figs. 3 and 4.

The sinking of the rotor 170 lowers the triangular cam 153 from its supporting position beneath the switch arm 114 thereby closing the switch 113 and energizing the solenoid 115 which rapidly draws the armature 116 downwardly into the solenoid and extends the contractile spring 117. The force thus applied through the spring 117 to the arm 47, rotates the shaft 45 as fast as the dash pot 133 will permit (which is not slowly, but fairly rapidly). The result of this rotation is illustrated in Figs. 3 and 4 and results also in the bridge plate 44 being depressed as shown in broken lines in Fig. 8.

The latter action presents the ledge 34 as a barrier interrupting the flow of fruit across the bridge plate 44 and thereby preventing an overloading of the bin 174 being used in the current weighing operation. Rotation of the shaft 45 also depresses the trip bar 87 until the foot 89 at the lower end of this comes to rest on the cushion block 54. This causes the cam 90 to shift the trip bar 87 away from the roller 59 against which this cam rolls.

This movement of the trip bar 87 withdraws the trip 96 from over the stop lever arm 68 but not before it has rocked the lever 67 enough to lift the roller 70 and permit the overbalanced rotor 170 to rotate to bring the adjacent lug 152 underneath the roller 70 thereby assuring an unimpeded ⅓ revolution of the rotor 170 under the impulse of the load of fruit contained in the upwardly disposed bin 174.

Figure 8:
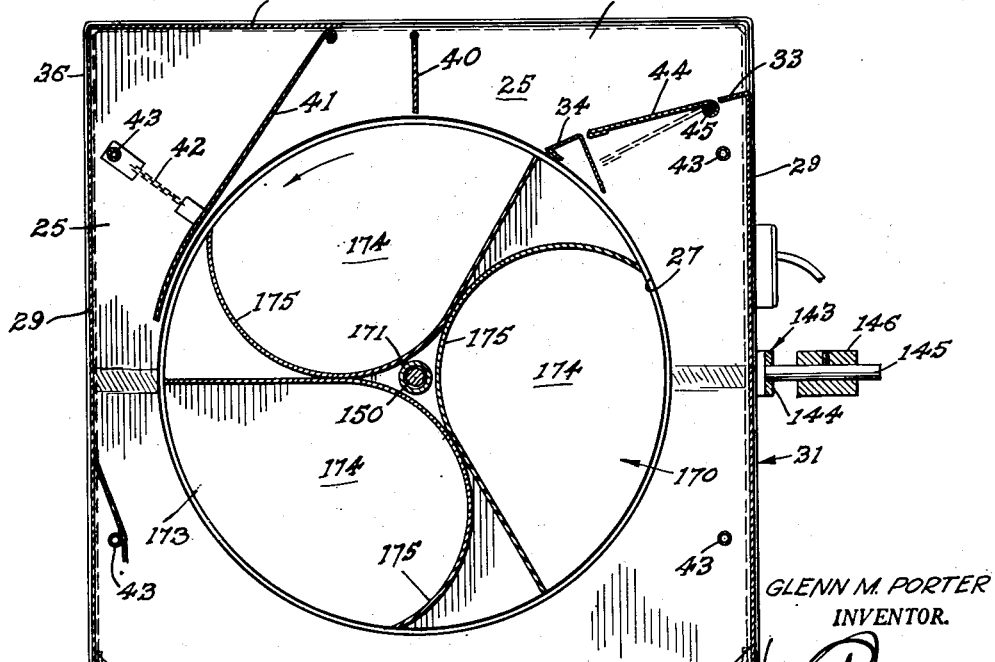
Fig. 8 is a cross sectional view taken on the line 8—8 of Fig. 7.

Rotation of the rotor brings this bin into downward position, as shown in Fig. 8, in which the fruit gravitates from this bin onto the receiving conveyor disposed beneath the conveyor.

It will be noted that as the rotor 170 starts to rotate after being once freed, the high point 154 of the cam 153 moves away from under the switch arm 114 (see Fig. 4) so that the switch 113 maintains the electric circuit of the solenoid 115 closed until the ⅓ rotation of the rotor 170 has been completed, the next high point 154 of the cam 153 has come directly under the switch arm 114 and the lightening of the rotor 170 by the discharge of fruit therefrom causes the counter-weight 146 to over-balance the rotor, rock the scale beam 143 and lift the rotor 170 to the same level it had at the start of the weighing operation.

Figure 5:
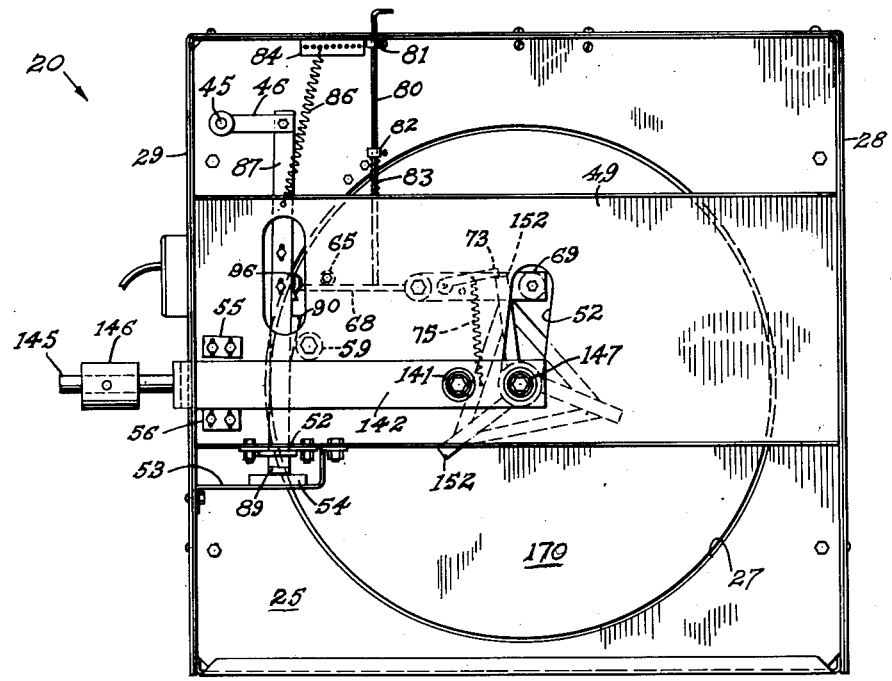
Fig. 5 is a view similar to Fig. 3 illustrating the visible parts of the weigher positioned at a certain instant just preceding the conclusion of a weighing operation.
Figure 6:
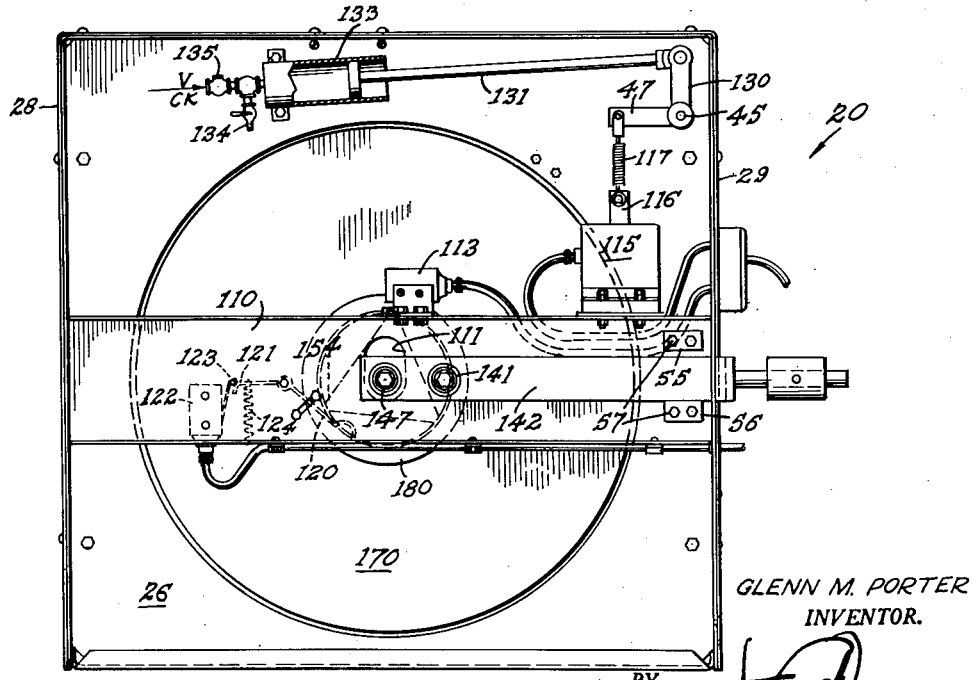
Fig. 6 is a view similar to Fig. 4 and illustrates the visible parts as they are positioned at the same instant mentioned in the description of Fig. 5.
Figure 7:
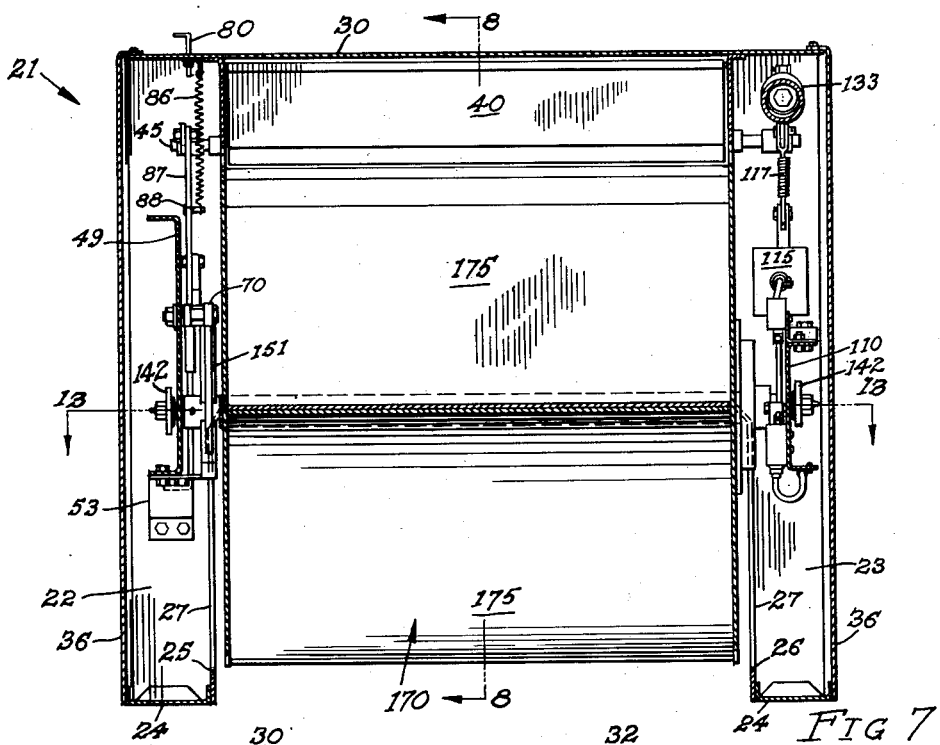
Fig. 7 is a cross sectional view taken on the line 7—7 of Fig. 1.
Figure 10:
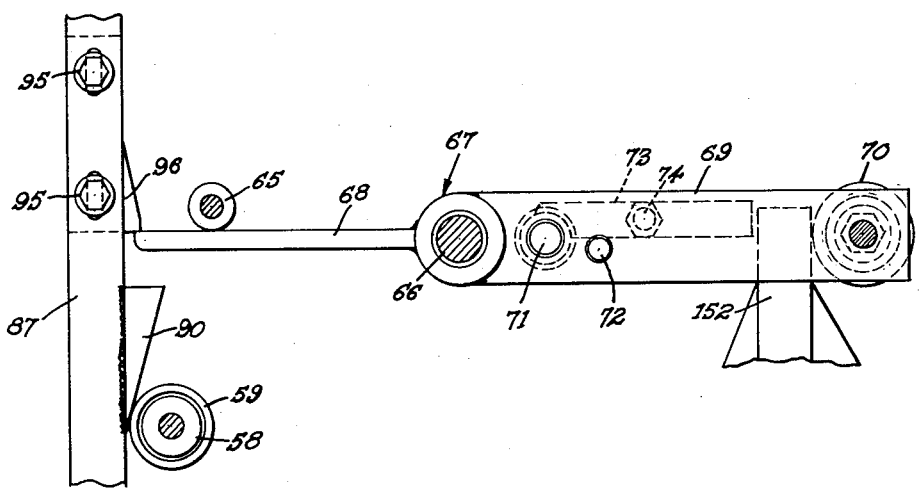
Fig. 10 is a fragmentary sectional view taken on the line 10—10 of Fig. 9.
Figure 9:
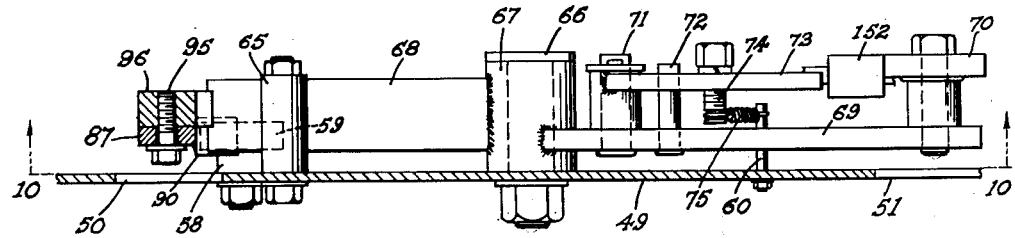
Fig. 9 is an enlarged horizontal sectional view taken on the line 9—9 of Fig. 1.

The position of the various parts of the weigher as the rotor approaches completion of its ⅓ revolution are illustrated in Figs. 5 and 6. The next succeeding lug 152 is here shown as engaging the latch 73 from underneath to swing this upwardly, permitting the stop arm 67 to remain horizontal where it is held by the spring 75, as this lug 152 swings past the latch 73 and against the stop roller 70, whereupon the latch 73 drops behind this lug as shown in Fig. 10 and positively retains the spider 151 against rotation. The cushion 182 takes up the shock of this sudden stopping of the rotation of the shaft 150 and transmits this gently to the rotor 170. The resilience of the cushion 157, however, causes the rotor 170 to turn back to its normal relation with the shaft 150 after the momentum of the rotor has been absorbed by the cushion 182.

At about the same instant the rotation of the rotor is stopped at the end of its ⅓ revolution, the switch arm 114 is lifted by the arrival of the next successive high point therebeneath as shown in Fig. 14, thereby breaking the circuit of the solenoid 115 which releases the downward pull on the spring 117 and permits the spring 86 on the other side of the machine to lift the trip bar 87 to bring the trip 96 above and in overlapping relation with the adjacent tip of the arm 68 (see Figs. 1 and 10) and lift the bridge plate 44 to again permit fruit to travel across this plate and the ledge 34 into the uppermost rotor bin 174. Thus a second weighing operation starts immediately after the first operation is completed.

Successive weighing cycles by the weigher 20 are performed in exactly the same manner as above described. During each weighing operation a high point 154 of the cam 153 engages the arm 120 of the cam responsive lever 119 to actuate the counter switch 122 and register a single weighing operation. Thus all the weighing operations are automatically recorded and the total of these may be read on the counter at the end of a given run of fruit through the weigher. The number of loads thus registered as having been weighed by the weigher 20, multiplied by the weight at which the counter-weight 146 is set on the scale bar 145, will give the total weight of the fruit run through the weigher 20.

The claims are:

1. In an automatic bulk weigher, the combination of: a frame; a U-shaped scale beam including side arms and a connecting member; a counter balance on said connecting member; fulcrum means on said frame for pivotally supporting said beam side arms; a shaft pivotally supported on the free ends of said side arms; a rotor rotatably supported on said shaft; means forming a series of weighing bins in said rotor; a spider fixed on said shaft and providing a series of lugs corresponding in number to said bins, and uniformly located with reference to said bins; a stop lever pivoted on said frame; a stop provided on said stop lever; a pin on said frame positioned to halt rotation of said stop lever with said stop positioned in the path of said lugs; means for conveying a flow of loose product into one of said bins when upwardly disposed; a gate for shutting off or starting said flow; a trip adapted to engage and rock said lever to remove said stop from in front of one of said lugs; a cam for deflecting said trip out of engagement with said lever after said trip has displaced said stop as aforesaid; a spring biasing said lever to cause it to return against said pin when thus released from said trip; a solenoid adapted when energized to operate said gate to shut off the flow of material to said bin and actuate said trip to trip said stop lever as aforesaid; a switch controlling said solenoid and actuated by the swinging of said scale beam to energize said solenoid thereby shutting off said supply of loose material to said bin, releasing said rotor from said stop and permitting the rotor to rotate to dump the contents from said bin and present the next adjacent bin in an upward position for receiving material to be weighed and bringing the next adjacent lug on said spider into engagement with said stop, said switch means keeping said solenoid energized and said gate positioned to shut off the flow of material until said switch is reversely actuated by a reverse swinging of said scale beam about its pivotal axis on said frame.

2. A combination as in claim 1 in which said solenoid control switch is mounted on said frame and is actuated by a multilobed cam provided on said rotor beneath said switch so that one of the lobes of said cam is brought upwardly beneath said switch and into operative engagement therewith to open said switch when said rotor has rotated to complete a single weighing cycle thus permitting said scale beam to rock about its axis and lift said multilobed cam to engage said switch, and actuate said switch to open the same and de-energize said solenoid.

GLENN M. PORTER.

REFERENCES CITED

The following references are of record in the file of this patent:

UNITED STATES PATENTS

| Number | Name | Date |
|---|---|---|
| 618,129 | Outcalt et al. | Jan. 24, 1899 |
| 1,082,354 | Mulloy | Dec. 23, 1913 |
| 1,615,485 | Rees | Jan. 25, 1927 |

FOREIGN PATENTS

| Number | Country | Date |
|---|---|---|
| 13,616 | Great Britain | July 26, 1892 |